United States Patent
Hévizi et al.

(10) Patent No.: US 8,331,995 B2
(45) Date of Patent: Dec. 11, 2012

(54) SECONDARY RADIO-NODES FOR MOBILE COMMUNICATIONS NETWORKS AND RELATED METHODS

(75) Inventors: László Hévizi, Piliscsaba (HU); István Gódor, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 202 days.

(21) Appl. No.: 12/831,838

(22) Filed: Jul. 7, 2010

(65) Prior Publication Data

US 2012/0009926 A1  Jan. 12, 2012

(51) Int. Cl.
*H04B 1/38* (2006.01)
(52) U.S. Cl. ...... 455/574; 455/507; 455/561; 455/550.1
(58) Field of Classification Search .................. 455/574, 455/507, 561, 550.1
See application file for complete search history.

(56) References Cited

U.S. PATENT DOCUMENTS

| | | | |
|---|---|---|---|
| 5,621,786 A | 4/1997 | Fischer et al. | |
| 5,867,766 A | 2/1999 | Dinc et al. | |
| 5,870,680 A | 2/1999 | Guerlin et al. | |
| 2001/0041551 A1* | 11/2001 | Rotzoll | 455/343 |
| 2003/0117996 A1 | 6/2003 | Lim et al. | |
| 2003/0223400 A1 | 12/2003 | Knisely et al. | |
| 2005/0122936 A1 | 6/2005 | Son et al. | |
| 2005/0255810 A1 | 11/2005 | Monroe | |
| 2007/0066273 A1 | 3/2007 | Laroia et al. | |
| 2007/0202871 A1* | 8/2007 | Altshuller et al. | 455/428 |
| 2008/0020751 A1 | 1/2008 | Li et al. | |
| 2009/0285142 A1 | 11/2009 | Zhang et al. | |
| 2010/0150112 A1* | 6/2010 | Lee et al. | 370/332 |
| 2011/0092234 A1* | 4/2011 | Kim et al. | 455/507 |

FOREIGN PATENT DOCUMENTS

| | | |
|---|---|---|
| CN | 1984424 A | 6/2007 |
| CN | 101026472 A | 8/2007 |
| CN | 101132595 A | 2/2008 |
| CN | 101404511 A | 4/2009 |
| CN | 201238299 Y | 5/2009 |
| EP | 2 056 628 A1 | 5/2009 |
| EP | 2 106 174 A2 | 9/2009 |
| EP | 2 157 824 A1 | 2/2010 |
| JP | 2007-104174 A | 4/2007 |
| KR | 10-2008-0071733 A | 8/2008 |

(Continued)

OTHER PUBLICATIONS

International Search Report Corresponding to International Application No. PCT/SE2011/050805; Date of Mailing: Oct. 26, 2011; 17 pages.

(Continued)

*Primary Examiner* — Danh Le
(74) *Attorney, Agent, or Firm* — Myers Bigel Sibley & Sajovec, P.A.

(57) ABSTRACT

A mobile communications network may include a primary and secondary radio-nodes, and the secondary radio-node may include a radio-node transmitter and a radio-node receiver. A method of operating the secondary radio-node may include monitoring through the radio-node receiver of the secondary radio-node to detect user terminal signals transmitted to the primary radio-node while maintaining the secondary radio-node in a sleep mode. Responsive to detecting user terminal signals during monitoring in the sleep-mode, operation of the secondary radio-node may be changed from the sleep mode to an active mode.

20 Claims, 4 Drawing Sheets

FOREIGN PATENT DOCUMENTS

| | | |
|---|---|---|
| WO | WO 00/32003 A2 | 6/2000 |
| WO | WO 2008/056023 A1 | 5/2008 |
| WO | WO 2008/131588 A1 | 11/2008 |
| WO | WO 2008/145062 A1 | 12/2008 |
| WO | WO 2010/030945 A1 | 3/2010 |
| WO | WO 2010/151186 A1 | 12/2010 |
| WO | WO 2011/010515 A1 | 1/2011 |

OTHER PUBLICATIONS

Reply to Written Opinion of the International Searching Authority Corresponding to International Application No. PCT/SE2011/050805; Date of Mailing: Feb. 6, 2012; 9 pages.

\* cited by examiner

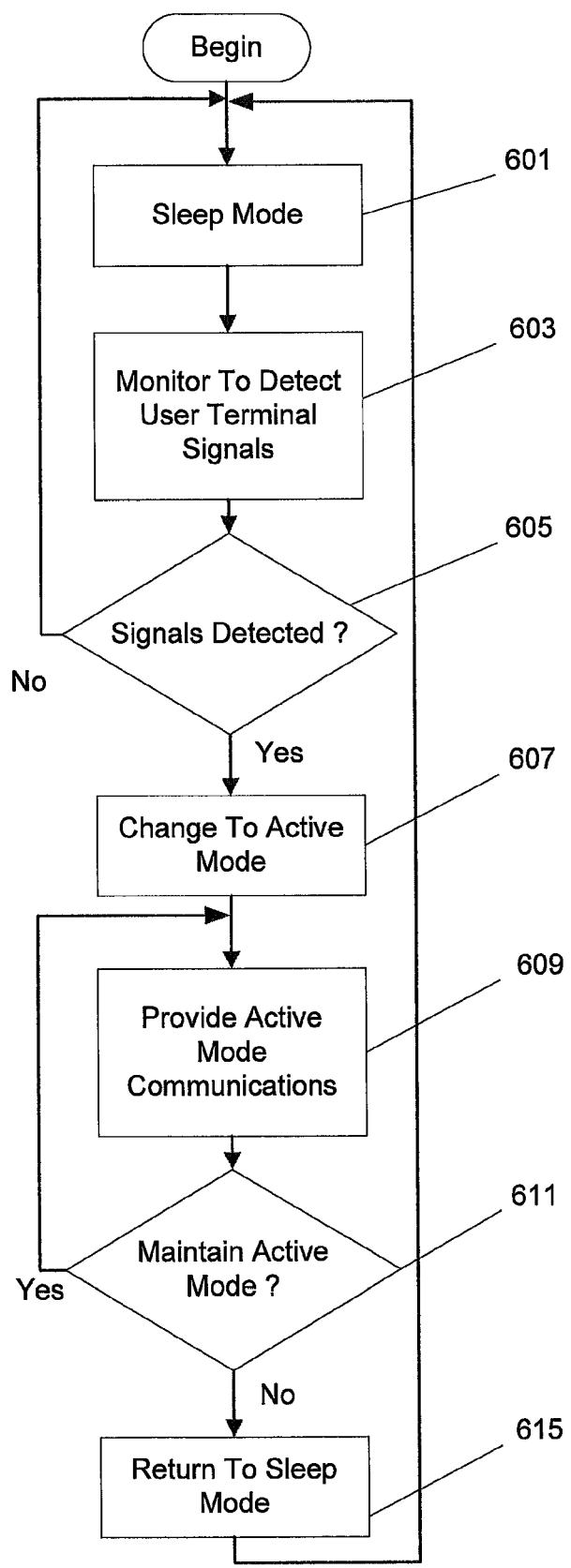

SECONDARY RADIO-NODES FOR MOBILE COMMUNICATIONS NETWORKS AND RELATED METHODS

BACKGROUND

The present invention relates to radio communications, and more particularly, to mobile communications networks including radio-nodes defining respective coverage areas.

A mobile communications network may include a plurality of spaced apart radio-nodes (also referred to as base stations) defining respective radio-node coverage areas (also referred to as cells). A mobile user terminal (e.g., a cellular radiotelephone) may thus communicate through a radio-node defining the radio-node coverage area in which the user terminal is located. By providing overlap between radio-node coverage areas of adjacent radio-nodes, a continuous network coverage area may be defined, and continuous communications for a moving user terminal may be provided using a hand-off of the user terminal from one radio-node to the next as the user terminal moves from one radio-node coverage area to the next.

Primary radio-nodes may provide coverage across an entirety of the network coverage area, but primary radio-nodes may not provide sufficient capacity to satisfy demand for communications in high density/traffic areas and/or during high density/traffic times. For example, a relatively high demand for communications may occur along a heavily traveled road during a high traffic period (e.g., during rush hour). In order to satisfy this relatively high demand, secondary radio-nodes may be provided in/along these high density/traffic areas.

SUMMARY

According to some embodiments of the present invention, a method of operating a secondary radio-node in a mobile communications network may be provided where the secondary radio-node includes a radio-node transmitter and a radio-node receiver and where the mobile communications network includes a primary radio-node. The method may include monitoring through the radio-node receiver of the secondary radio-node to detect user terminal signals transmitted to the primary radio-node while maintaining the secondary radio-node in a sleep mode. In addition, operation of the secondary radio-node may be changed from the sleep mode to an active mode responsive to detecting user terminal signals during monitoring in the sleep-mode.

In the sleep mode, the radio-node transmitter of the secondary radio-node may be in a low power mode. In the sleep mode, for example, the radio-node transmitter of the secondary radio-node may be off, and in the active mode, the radio-node transmitter of the secondary radio-node may be on. The radio-node transmitter of the secondary radio-node, for example, may include a modulator, a frequency generator, and/or a power amplifier, and the modulator, the frequency generator, and/or the power amplifier may be turned off in the sleep mode to conserve power. In the active mode, the modulator, the frequency generator, and the power amplifier may be turned on to support active mode communications. Transmission of a control channel from the secondary radio-node during the sleep mode may be suppressed, but during the active mode, a control channel may be transmitted from the secondary radio-node.

The primary radio-node and the secondary radio-node may define respective overlapping primary coverage area and secondary coverage area, and detecting user terminal signals may include detecting user terminal signals transmitted from a user terminal operating in the secondary coverage area to the primary radio-node. In addition, communications with the user terminal may be provided from the secondary radio-node responsive to changing operation of the secondary radio-node to the active mode. More particularly, the communications with the user terminal may be received at the radio-node receiver of the secondary radio-node and transmitted from the radio-node transmitter of the secondary radio-node.

After terminating communication between the user terminal and the secondary radio-node, operation of the secondary radio-node may be changed from the active mode to the sleep mode. Monitoring to detect user terminal signals may include monitoring over frequencies used by the primary radio-node. The primary radio-node and the secondary radio-node may operate over a same frequency band, monitoring may include monitoring the frequency band to detect user terminal signals, and the communications with the user terminal may be received at the radio-node receiver of the secondary radio-node over the frequency band. The primary radio-node and the secondary radio-node may operate using respective different first and second frequency bands, monitoring may include monitoring the first frequency band to detect user terminal signals, and the communications with the user terminal may be received at the radio-node receiver of the secondary radio-node over the second frequency band.

Monitoring to detect user terminal signals may include monitoring received signal strength (e.g., RSSI) over frequencies used by the primary radio-node without decoding and/or without converting to baseband, and the secondary radio-node may be changed from the sleep mode to the active mode responsive to the received signal strength exceeding a received signal strength threshold. Monitoring to detect user terminal signals may include monitoring a number of user terminals transmitting over frequencies used by the primary radio-node, and the secondary radio-node may be changed from the sleep mode to the active mode responsive to the number of user terminals exceeding a threshold number of user terminals.

The secondary radio-node may provide a Radio Access Technology (RAT) that is unavailable from the primary radio-node, and monitoring may include monitoring to detect user terminal signals from a user terminal compatible with the Radio Access Technology provided by the secondary radio-node. Changing operation of the secondary radio-node (from the sleep mode to the active mode) may include providing communications with the user terminal from the secondary radio-node according to the Radio Access Technology (that is unavailable from the primary radio-node) so that the communications with the user terminal are received at the radio-node receiver of the secondary radio-node and transmitted from the radio-node transmitter of the secondary radio-node.

According to some other embodiments of the present invention, a secondary radio-node may be provided in a mobile communications network with a primary radio-node, and the secondary radio-node may include a radio-node transmitter, a radio-node receiver, and a processor. The processor may be coupled to the radio-node transmitter and to the radio-node receiver of the secondary radio-node. Moreover, the processor may be configured to monitor through the radio-node receiver to detect user terminal signals transmitted to the primary radio-node while maintaining the secondary radio-node in a sleep-mode. The processor may be further configured to change operation of the secondary radio-node from the sleep mode to an active mode responsive to detecting user terminal signals during monitoring in the sleep-mode.

In the sleep mode, the radio-node transmitter of the secondary radio-node may be in a low power mode. In the sleep mode, for example, the radio-node transmitter of the secondary radio-node may be off, and in the active mode, the radio-node transmitter of the secondary radio-node may be on. The radio-node transmitter of the secondary radio-node, for example, may include a modulator, a frequency generator, and/or a power amplifier, and the modulator, the frequency generator, and/or the power amplifier may be turned off in the sleep mode to conserve power. In the active mode, the modulator, the frequency generator, and the power amplifier may be turned on to support active mode communications. Transmission of a control channel from the secondary radio-node during the sleep mode may be suppressed, but during the active mode, a control channel may be transmitted from the secondary radio-node.

The primary radio-node and the secondary radio node may define respective overlapping primary coverage area and secondary coverage area. The processor may be configured to monitor to detect through the radio-node receiver user terminal signals transmitted from a user terminal operating in the secondary coverage area to the primary radio-node. The processor may also be configured to provide communications with the user terminal through the radio-node transmitter and the radio-node receiver responsive to changing operation of the secondary radio-node to the active mode.

The radio-node receiver of the secondary radio-node may include an active mode receiver configured to receive communications during active mode operation and a sleep mode receiver configured to detect user terminal signals during sleep mode operation. The processor may also be configured to change operation of the secondary radio-node from the active mode to the sleep mode after terminating communication between the user terminal and the secondary radio-node.

The processor may be configured to monitor to detect user terminal signals by monitoring over frequencies used by the primary radio-node. The primary radio-node and the secondary radio-node may operate over a same frequency band, the processor and the radio-node receiver of the secondary radio-node may be configured to monitor the frequency band to detect user terminal signals, and the processor and the radio-node receiver of the secondary radio-node may be configured to receive communications from the user terminal over the frequency band. The primary radio-node and the secondary radio-node may operate using respective different first and second frequency bands, the processor and the radio-node receiver of the secondary radio-node may be configured to monitor the first frequency band to detect user terminal signals, and the processor and the radio-node receiver of the secondary radio-node may be configured to receive communications from the user terminal over the second frequency band. The radio-node receiver of the secondary radio-node may include an active mode receiver configured to receive communications over the second frequency band during active mode operation and a sleep mode receiver configured to monitor the first frequency band during sleep mode operation.

The processor may be configured to monitor received signal strength over frequencies used by the primary radio-node without decoding and/or without converting to baseband, and the processor may be configured to change the secondary radio-node from the sleep mode to the active mode responsive to the received signal strength exceeding a received signal strength threshold. The processor may be configured to monitor a number of user terminals transmitting over frequencies used by the primary radio-node, and the processor may be configured to change the secondary radio-node from the sleep mode to the active mode responsive to the number of user terminals exceeding a threshold number of user terminals.

The processor, the radio-node receiver, and the radio-node transmitter of the secondary radio-node may be configured to provide communications according to a Radio Access Technology (RAT) that is unavailable from the primary radio-node. The processor and the radio-node receiver of the secondary radio-node may be configured to detect user terminal signals from a user terminal compatible with the Radio Access Technology provided by the secondary radio-node. The processor may be configured to provide communications with the user terminal from the secondary radio-node according to the Radio Access Technology so that the communications with the user terminal are received at the radio-node receiver of the secondary radio-node and transmitted from the radio-node transmitter of the secondary radio-node.

BRIEF DESCRIPTION OF THE DRAWINGS

FIG. 6 is a flow chart illustrating operations of a secondary radio-node according to some embodiments of the present invention.

DETAILED DESCRIPTION

Figure 1:
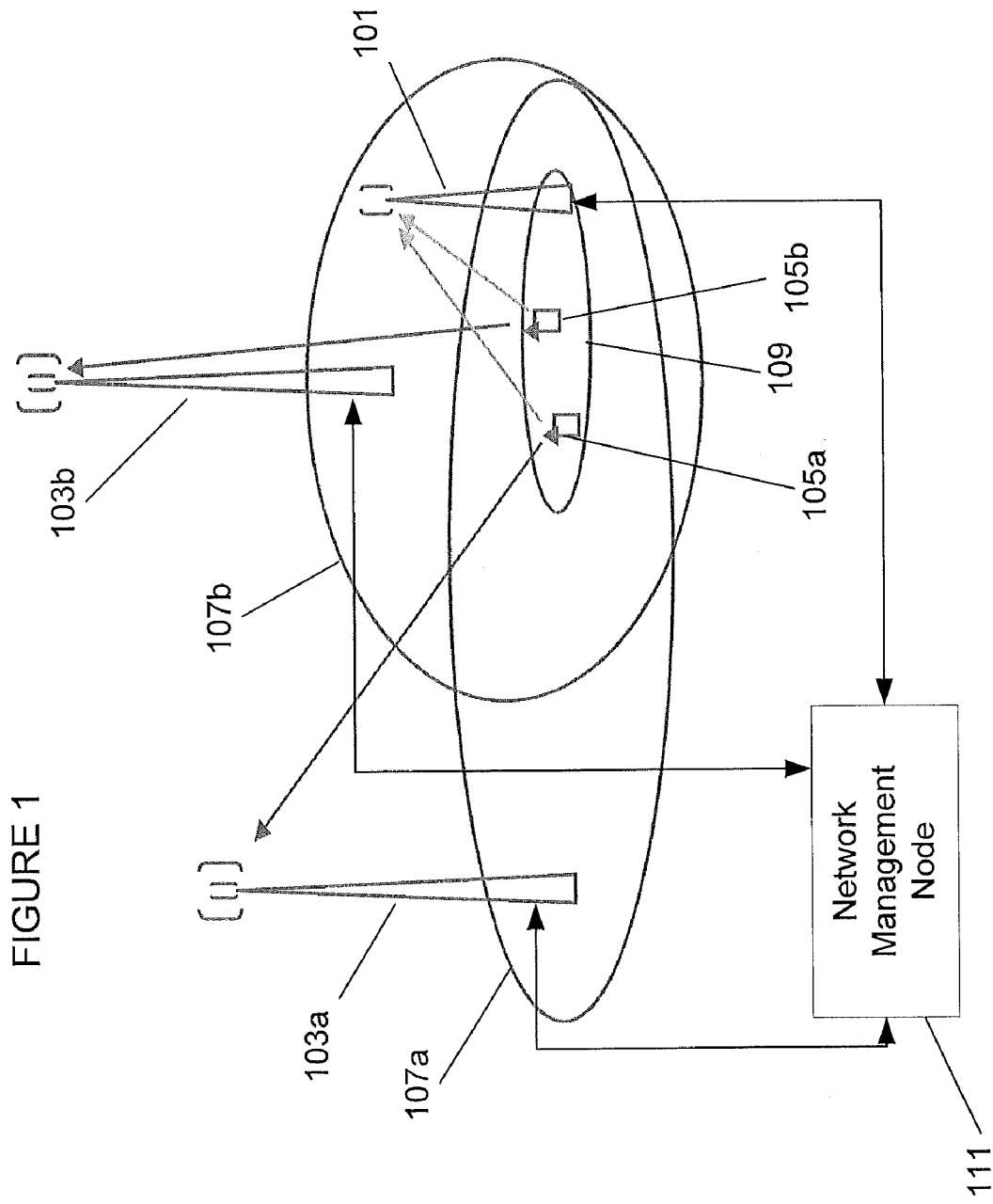
FIG. 1 is a schematic diagram of a mobile communications network according to some embodiments of the present invention.

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1710 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in embodiments according to the invention.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments are disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

For purposes of illustration and explanation only, various embodiments of the present invention are described herein in the context of user terminals (e.g., "wireless user terminals", "wireless communication terminals", "wireless terminals", "terminals", etc.) that are configured to carry out cellular communications (e.g., cellular voice and/or data communications). It will be understood, however, that the present invention is not limited to such embodiments and may be embodied generally in any wireless communication terminal that is configured to transmit and receive according to one or more RATs.

According to some embodiments of the present invention shown in the schematic diagram of FIG. 1, a mobile communications network may include a plurality of primary radio-nodes 103a and 103b (also referred to as macro-layer radio-nodes, macro-layer base stations, primary base stations, etc.) and a secondary radio-node 101 (also referred to as a micro-layer radio-node, a micro-layer base station, a secondary base station, etc.). The primary radio-nodes 103a and 103b may define respective primary coverage areas 107a and 107b, the secondary radio-node 101 may define a secondary coverage area 109, and secondary coverage area 109 may overlap primary coverage area 107a and/or primary coverage area 107b. Moreover, secondary coverage area 109 may be included within primary coverage area 107a and/or within primary coverage area 107b, and network management node 111 may facilitate operations of and communications between primary and secondary radio-nodes 103a, 103b, and 101.

Network management node 111 may provide data connection/communication (e.g., via wired connection, wireless radio connection, fiber optic connection, microwave connection, and/or combinations thereof) between primary and secondary radio-nodes 103a, 103b, and 101, and network management node 111 may provide balancing of data communications between radio-nodes, coordination of handoffs between radio-nodes, connection to other communications networks (e.g., a Public Switched Telephone network (PSTN), the Internet, etc.), etc. Functionality of Network Management Node 111 may be provided at a single site separate from radio-nodes, distributed across different sites separate from radio-nodes, distributed among radio-nodes, distributed among radio-nodes and one or more sites separate from the radio-nodes, etc.

Primary and secondary radio-nodes 103 and 101 may be deployed according to a hierarchical network architecture with the primary radio-nodes being deployed initially as a macro-layer to provide service/coverage for a service area. One or more secondary radio-nodes 101 (e.g., micro-base stations, relays, repeaters, etc.) may be deployed subsequently to provide extra capacity in high traffic areas, to provide enhanced services (e.g., increased data rate services, mobile internet access, etc.), to provide improved coverage, to provide improved service quality, to provide a Radio Access Technology (RAT) not available through primary base stations 103, etc. A network operator may thus initially deploy primary radio-nodes 103 to support communications services over a service area according to a RAT available at the time of initial deployment, and then, the network operator may later deploy secondary radio-nodes 109 over time to selectively add capacity and/or to support one or more subsequent RATs. With secondary radio-node(s) 101 providing relatively small coverage area(s) 109 (as compared with primary coverage areas 107 provided by primary radio-nodes 103), a network operator may selectively upgrade capacity/service over time in relatively high traffic areas.

If secondary radio-node 101 is provided to increase network capacity in a high traffic area (e.g., along a portion of a heavily traveled road), secondary radio-node 101 may only be needed during high traffic times (e.g., during rush hour traffic) when demand for network services in secondary coverage area 109 exceeds a capacity provided by primary radio-nodes 103a and/or 103b. Similarly, if secondary radio-node 101 provides a RAT not supported by primary radio-nodes 103a and/or 103b, secondary radio-node 101 may only be needed when user terminals 105 supporting the RAT not supported by primary radio-nodes 103a and/or 103b are in secondary coverage area 109. Primary radio-nodes 103a/103b, for example, may support one or more RATs providing voice, paging, and basic packet data services without providing broadband service, and secondary radio-node may provide voice, paging, basic packet data, and broadband services in relatively high traffic areas. During low traffic periods in secondary coverage area 109 and/or when there is no demand for service in secondary coverage area 109 using a RAT not provided by primary radio-node 103a/103b, secondary-radio node 101 may be unneeded.

According to some embodiments of the present invention, secondary radio-node 101 may operate in a sleep mode when not needed with its transmitter off to conserve power. While in the sleep mode, secondary radio-node 101 may monitor to detect signals transmitted to a primary radio-node 103 (e.g., uplink signals), and secondary radio-node 101 may change operation to an active mode with its transmitter on to provide additional capacity/service as needed. Once the capacity/service is no longer needed in secondary coverage area 109, secondary radio-node may change operation back to the sleep mode to conserve power. Decisions to change operation of secondary radio-node 101 from the active mode to the sleep mode and/or from the sleep mode to the active mode may be made at secondary base station 101 and/or at network management node 111.

Figure 2:
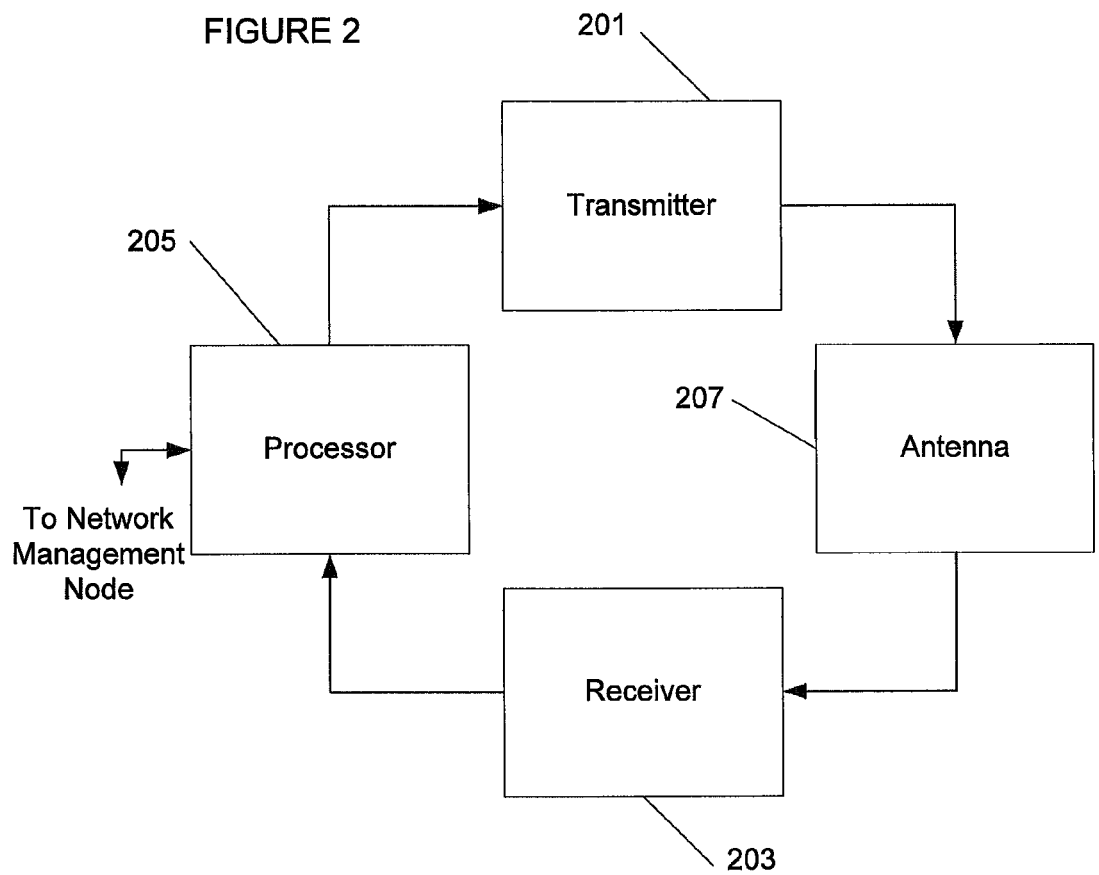
FIG. 2 is a block diagram of a secondary radio-node according to some embodiments of the present invention.

As shown in the block diagram of FIG. 2, secondary radio-node 101 may include radio-node transmitter 201, radio-node receiver 203, processor 205, and antenna 207, and processor 205 may be coupled to radio-node transmitter 201 and to radio-node receiver 203 of secondary radio-node 101. More particularly, processor 205 may be configured to monitor through radio-node receiver 203 to detect uplink signals from user terminals 105a and/or 105b (in secondary coverage area 109) transmitted to primary radio-node 103a and/or 103b while maintaining the secondary radio-node 101 in the sleep-mode with radio-node transmitter 201 of the secondary radio-node 101 off. Responsive to detecting user terminal uplink signals (transmitted by user terminals 105a and/or 105b) during monitoring in the sleep mode, processor 205 may be configured to change operation of secondary radio-node 101 from the sleep mode with radio-node transmitter 201 off to the active mode with radio-node transmitter 201 on responsive to detecting user terminal uplink signals. Processor 205 may thus maintain secondary radio-node 101 in the sleep mode with radio-node transmitter 201 off as long as a sufficient threshold of user terminal activity is not detected. Because an entirety of secondary coverage area 109 is included in primary coverage area 107a and/or 107b, network coverage for the entire coverage area may be maintained intact even when secondary radio-node 101 is in the sleep mode.

Figure 3:
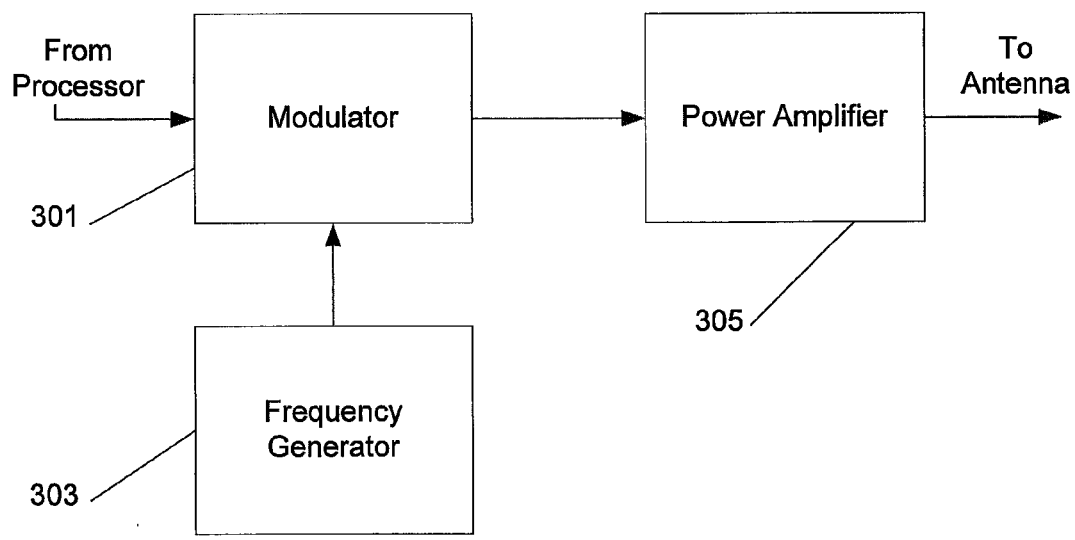
FIG. 3 is a block diagram of a radio-node transmitter of a secondary radio-node according to some embodiments of the present invention.

As shown in the block diagram of FIG. 3, radio-node transmitter 201 may include modulator 301, frequency generator 303, and power amplifier 305. In the sleep mode, processor 205 may be configured to turn off modulator 301, frequency generator 303, and/or power amplifier 305 to conserve power. Accordingly, processor 205 may be configured to suppress transmission of a control channel (e.g., a broadcast control channel) from secondary radio-node 101 during the sleep mode. During the active mode, the processor 205 may be configured to turn modulator 301, frequency generator 303, and power amplifier 305 on to support active mode communications including transmission of a control channel (e.g., a broadcast control channel). As noted above, decisions to switch secondary radio-node 101 between the sleep and active modes may be made at processor 205 of the secondary radio-node 101 and/or at network management node 111, and/or decisions to switch secondary radio-node 101 between sleep and active modes may be shared between processor 205 and network management node 111. Moreover, functionality of processor 205 may be provided at secondary radio-node 101, at network management node 111, and/or shared between secondary radio-node 101 and network management node.

While in the sleep mode, processor 205 may be configured to monitor (through radio-node receiver 203) to detect user terminal uplink signals transmitted from user terminal 105a and/or 105b (operating in secondary coverage area 109) to primary radio-node 103a and/or 103b. Upon detecting a sufficient threshold of user terminal activity in secondary coverage area 109, processor 205 may be configured to change operation of secondary radio-node 101 to the active mode and to provide communications with user terminal 105a and/or 105b through radio-node transmitter 201 and radio-node receiver 203. According to some embodiments of the present invention, processor 205 may detect an ongoing communication (e.g., a radiotelephone voice communication, a data text communication, a client/server network communication, etc.) between user terminal 105a/105b and primary radio-node 103a/103b, and processor 205 may change operation of secondary radio-node 101 from the sleep mode to the active mode to effect a hand-off of the existing communication with user terminal 105a/105b from primary radio-node 103a/103b to secondary radio node 101. According to some other embodiments of the present invention, processor 205 may detect a request by user terminal 105a/105b for communication (transmitted to primary radio-node 103a/103b), and responsive to detecting the request from communication, processor 205 may change operation of secondary radio-node 101 from the sleep mode to the active mode so that the communication is initiated between user terminal 105a/105b and secondary radio-node 101 and no hand-off is required.

Figure 4A:
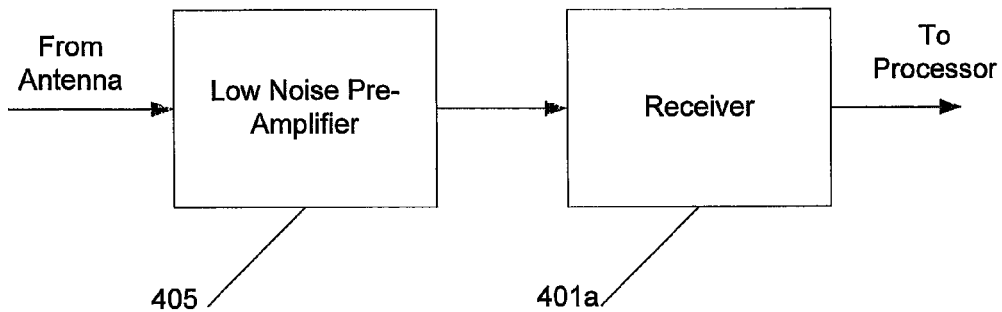
FIGS. 4A and 4B are block diagrams of radio-node receivers of a secondary radio-node according to some embodiments of the present invention.

According to some embodiments of the present invention, radio-node receiver 203 of secondary radio-node 101 may include a single receiver chain used for both active and sleep mode operations with low noise pre-amplifier 405 and receiver 401a, as shown in FIG. 4A. Receiver 401a and processor 205 may thus be configured during sleep mode to monitor to detect user terminal signals by monitoring over frequencies used by the primary radio-node 103. More particularly, primary radio-nodes 103a and/or 103b and secondary radio-node 101 may operate over a same frequency band using a same RAT, and processor 205 and receiver 401a of the secondary radio-node 101 may be configured to monitor the frequency band during the sleep mode to detect user terminal signals. Moreover, processor 205 and receiver 401a may be configured to receive communications from user terminal 105a and/or 105b during the active mode over the same frequency band that is monitored during the sleep mode. Primary radio-nodes 103a/103b and secondary radio-node 101, for example, may operate according to a same RAT using the same frequency band or using different frequency bands of a same RAT allowing use of a same receiver chain for scanning during the sleep mode and for communications during the active mode. Accordingly, primary radio-nodes 103a/103b and secondary radio-node 101 may operate on different frequencies of the same frequency band of the same RAT. Receiver 401a may thus be used for both sleep mode monitoring and for active mode reception so that extra equipment for sleep mode monitoring/detection may not be required. During the sleep mode, receiver 401a may be tuned to frequencies used by primary radio-nodes 103a/103b, and during the active mode, receiver 401a may be tuned to frequencies used by secondary radio-node 101. In an alternative to conserve power, a separate sleep mode receiver may provide a measure of received signal strength (e.g., RSSI) without downconverting to baseband and/or without decoding.

According to some embodiments of the present invention, receiver 401a and processor 205 may be configured to fully process (e.g., convert to baseband and decode) signals transmitted from user terminals 105a/105b to primary radio-nodes 103a/103b during sleep mode operations. Accordingly, processor 205 may be able to determine/estimate numbers of user terminals 105a/105b in coverage area 109, capabilities of user terminals 105a/105b in coverage area 109, distances of user terminals 105a/105b from secondary radio-node 101, etc., and processor 205 may use this information to determine when to transition between sleep and active modes. Processor 205, for example may transition from the sleep mode to the active mode responsive to a number of user terminals 105 in coverage area 109 exceeding a threshold number of user terminals for a threshold period of time, responsive to one or more user terminals in coverage area 109 requesting a communications service provided by secondary radio-node 101 that is not provided by primary radio-nodes 103a/103b, etc.

According to some other embodiments of the present invention, receiver 401a and processor 205 may be configured during the sleep mode to monitor received signal strength over frequencies used by the primary radio-node 103 without decoding and/or without converting to baseband. Receiver 401a and/or processor 205, for example, may be configured to generate a Received Signal Strength Indication (RSSI) indicative of an aggregate signal strength of signals transmitted from user terminals 105 in coverage area 109 to primary radio-nodes 103. Accordingly, processor 205 may be configured to change secondary radio-node 101 from the sleep mode to the active mode responsive to the received signal strength exceeding a received signal strength threshold. More particularly, processor 205 may be configured to change secondary radio-node 101 from the sleep mode to the active mode responsive to the received signal strength exceeding the received signal strength threshold for a threshold period of time. By monitoring only a received signal strength, elements of receiver 401a used for decoding and/or baseband conversion may be turned off during the sleep mode to further conserve power, and then turned on during the active mode.

Figure 4B:
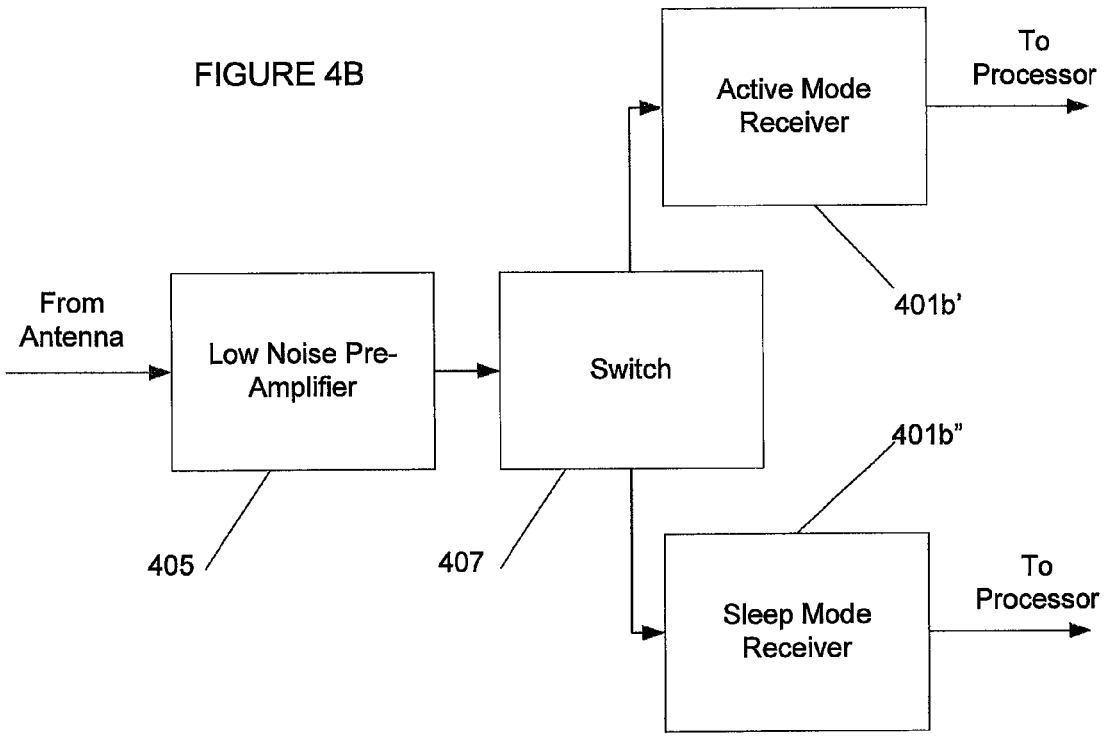

According to some other embodiments of the present invention, radio-node receiver 203 of secondary radio node 101 may include separate active mode and sleep mode receivers 401b' and 401b", as shown in FIG. 4B. More particularly, switch 407 may provide coupling between low noise pre-amplifier 405b and sleep mode receiver 401b" with active mode receiver 401b' off during the sleep mode, and switch 407 may provide coupling between low noise pre-amplifier 405b and active mode receiver 401b' with sleep mode receiver 401b" off during the active mode. Separate receiver chains as shown in FIG. 4B may allow monitoring different frequency bands and/or monitoring different RATs using sleep mode receiver 401b'' during the sleep mode than those received using active mode receiver 401b' during the active mode, and/or separate receiver chains may allow use of a relatively low power sleep mode receiver 401b'' that monitors a received signal strength (e.g., RSSI) without converting to baseband and/or without decoding.

Active mode receiver 401W may thus be configured to receive communications during active mode operation, and sleep mode receiver 401b'' (e.g., a scanning receiver) may be configured to detect user terminal signals during sleep mode operation. More particularly, active mode receiver 401b' and sleep mode receiver 401b'' may be configured to receive over respective different and non-overlapping frequency bands of the same or different RATS, with active mode receiver 401b' used to provide active mode communications between secondary radio-node 101 and user terminals 105 during the active mode, and with sleep mode receiver 401b'' used to provide monitoring of frequencies/RATs used by primary radio-nodes 103 during the sleep mode.

According to some embodiments, primary and secondary radio-nodes 103 and 101 may operate using respective first and second different frequency bands of a same RAT (e.g., 850 MHz and 2100 MHz), with processor 205 and sleep mode receiver 401b'' being configured to monitor the first frequency band to detect user terminal signals during the sleep mode with active mode receiver 401b' off. During the active mode, processor 205 and active mode receiver 401b' may be configured to receive communications from the user terminal 105 over the second frequency band with sleep mode receiver 401b'' off. Sleep mode receiver 401b'' may monitor communications between user terminals 105 and primary radio-nodes 103 (including converting to baseband and decoding) during the sleep mode so that numbers of user terminals, capabilities of user terminals, distances of user terminals, etc. in coverage area 109 may be determined/estimated. In an alternative, sleep mode receiver 401b'' may monitor an aggregate received signal strength (without converting to baseband and/or without decoding) with active mode receiver 401b' off to reduce power consumption during the sleep mode operation, and active mode receiver 401b'' may receive communications during active mode operation with sleep mode receiver 401b'' off.

According to some embodiments, primary and secondary radio-nodes 103 and 101 may operate using respective first and second different frequency bands of respective first and second different RATs, with processor 205 and sleep mode receiver 401b'' being configured to monitor the first frequency band of the first RAT to detect user terminal signals during the sleep mode with active mode receiver 401b' off. During the active mode, processor 205 and active mode receiver 401b' may be configured to receive communications from user terminals 105 over the second frequency band of the second RAT with sleep mode receiver 401b'' off. Sleep mode receiver 401b'' may monitor communications between user terminals 105 and primary radio-nodes 103 (including converting to baseband and decoding) during the sleep mode so that numbers of user terminals, capabilities of user terminals, distances of user terminals, etc. in coverage area 109 may be determined/estimated. In an alternative, sleep mode receiver 401b'' may monitor an aggregate received signal strength (without converting to baseband and/or without decoding) with active mode receiver 401b' off to reduce power consumption during the sleep mode operation, and active mode receiver 401b'' may receive communications during active mode operation with sleep mode receiver 401b'' off.

According to some embodiments, primary and secondary radio-nodes 103 and 101 may operate using a same frequency band and a same RAT, with processor 205 and sleep mode receiver 401b'' being configured to monitor the frequency band to detect user terminal signals during the sleep mode with active mode receiver 401b' off. During the active mode, processor 205 and active mode receiver 401b' may be configured to receive communications from the user terminal 105 over the frequency band with sleep mode receiver 401b'' off. More particularly, sleep mode receiver 401b'' may monitor an aggregate received signal strength (without converting to baseband and/or without decoding) with active mode receiver 401b' off to reduce power consumption during the sleep mode operation, and active mode receiver 401b'' may receive communications during active mode operation with sleep mode receiver 401b'' off.

Processor 205 and/or sleep mode receiver 401b'' may thus be configured during the sleep mode to monitor received signal strength (e.g., RSSI) over frequencies used by the primary radio-node 103 without decoding and/or without converting to baseband to conserver power. Accordingly, processor 205 may be configured to change secondary radio-node 101 from the sleep mode to the active mode responsive to the received signal strength exceeding a received signal strength threshold over a threshold period of time. According to some other embodiments, processor 205 and/or sleep mode receiver 401b'' may be configured to convert to baseband and decode user terminal signals to monitor a number of user terminals transmitting over frequencies used by the primary radio-node 103, and processor 205 may be configured to change secondary radio-node 101 from the sleep mode to the active mode responsive to a number of user terminals exceeding a threshold number of user terminals. Processor 205 and/or sleep mode receiver 401 may be further configured to distinguish between distances of user terminals from secondary radio-node 101 when determining whether to change to the active mode.

Figure 5:
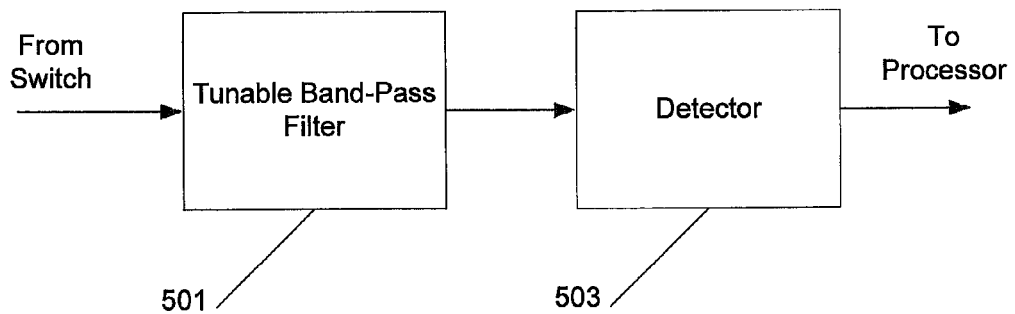
FIG. 5 is a block diagram of a sleep-mode receiver of a secondary radio-node according to some embodiments of the present invention.

According to embodiments where sleep mode receiver 401b'' and/or processor 205 monitor a received signal strength to determine when to change secondary radio-node 101 from the sleep mode to the active mode, sleep mode receiver 401b'' may include a tunable band-pass filter 501 and detector 503 as shown in FIG. 5. Detector 503 may be configured to generated a received signal strength (e.g., RSSI) that is transmitted to processor 205 without downconverting to baseband and/or without decoding. A simplified sleep mode receiver may thus be provided that reduces power consumption during sleep mode operation. According to embodiments where sleep mode receiver 401b'' and/or processor 205 monitor numbers, capabilities, distances, etc. of user terminals, sleep mode receiver 401b'' may be a complete receive, for example, providing downconverting to baseband and decoding.

Processor 205, radio-node receiver 203 (including active mode and sleep mode receivers 401b' and 401b''), and radio-node transmitter 201 may thus be configured to provide communications according to a Radio Access Technology (RAT) that is unavailable from primary radio-node 103. Processor 205 and radio-node receiver 203, for example, may be configured to detect user terminal signals from user terminal(s) 105 compatible with the Radio Access Technology provided by secondary radio-node 101, and processor 205 may be configured to provide communications with user terminal(s) 105 from the secondary radio-node 101 according to the Radio Access Technology so that the communications with user terminal(s) 105 are received at radio-node receiver 203 (including active mode and sleep mode receivers 401b' and 401b″) and transmitted from radio-node transmitter 201 of the secondary radio-node 101. According to some embodiments, a user terminal 105 communicating with a primary radio-node 103 according to a first RAT may request a service (e.g., broadband internet access) according to a second RAT that is unavailable at the primary radio-node 103, and responsive to detecting this request while in the sleep mode, processor 205 may change secondary radio-node 101 from the sleep mode to the active mode to allow communication between the user terminal 105 and secondary base station 101 according to the second RAT. In addition or in an alternative, the user terminal 105 may transmit a request for service to the primary radio-node 103 (before providing any substantive communication between the user terminal 105 and the primary radio-node), and responsive to detecting the request, processor 205 may change secondary radio-node 101 from the sleep mode to the active mode to allow communication between the user terminal 105 and secondary radio-node 101.

In each of the embodiments discussed above with respect to FIGS. 2, 3, 4A, 4B, and 5, receiver 203 (e.g., including receiver 401a of FIG. 4A and/or including active mode and sleep mode receivers 401b′ and 401b″ of FIG. 4B) may use the same antenna system to monitor user terminals 105 during the sleep mode and to receive communications from user terminals 105 during the active mode. For example, the same elements of antenna 207 of FIG. 2 may be used to both monitor during the sleep mode and to receive communications during the active mode. Accordingly, a definition of coverage area 109 may be substantially the same for both sleep mode monitoring and active mode reception.

According to other embodiments, receiver 203 (e.g., including receiver 401a of FIG. 4A and/or including active and sleep mode receivers 401b′ and 401b″ of FIG. 4B) may use different antenna systems to monitor communications from user terminals 105 during the sleep mode and to provide communications with user terminals 105 during the active mode. By way of example, secondary radio-node 101 may be an indoor radio-node and secondary coverage area 109 may be an indoor pico-cell defined by walls of the indoor area. In such an embodiment, a relatively inexpensive sleep mode antenna may be used in the sleep mode to receive any scattered signals in the (indoor) secondary coverage area 109. Such an inexpensive sleep mode antenna may be provided in addition to an active mode antenna used for active mode reception/transmission.

According to some embodiments of the present invention, secondary radio-node 101 may act autonomously to determine when to transition from the sleep mode to the active mode. During the sleep mode, for example, processor 205 of secondary radio-node 101 may determine when to change operation of secondary radio-node 101 from the sleep mode to the active mode based on detected communications from user terminals 105 in secondary coverage area 109 without requiring input from network management node 111. Upon changing to the active mode, processor 205 and transmitter 201 may initiate transmission of a control channel (e.g., a broadcast control channel) from antenna 207 to announce availability of service from secondary radio-node 101, and communications between user terminals 105 and secondary radio-node 101 may be initiated and/or handed off from primary radio-nodes 103. Processor 205 may also determine when secondary radio-node should return to the sleep mode, for example, when active communications between user terminals 105 and secondary radio-node 101 have been dormant for a threshold period of time, and/or when primary radio-nodes 103 have sufficient capacity to handle traffic in primary coverage areas 107 including secondary coverage area 109.

According to some other embodiments of the present invention, secondary radio-node 101 may act under the direction of network management node 111 when transitioning from the sleep mode to the active mode so that active/sleep mode decisions are handled by network management node 111. During the sleep mode, for example, processor 205 may transmit information (regarding detected communications from user terminals 105 in secondary coverage area 109) to network management node 111, and network management node 111 may determine when to change operation of secondary radio-node 101 from the sleep mode to the active mode. Network management node 111, for example, may consider the information received from secondary radio-node together with information received from primary radio-nodes 103 when determining whether to transition secondary radio-node 101 from the sleep mode to the active mode. Network management node 111, for example, may also determine when secondary radio-node 101 should return to the sleep mode, for example, when active communications between user terminals 105 and secondary radio-node 101 have been dormant for a threshold period of time, and/or when primary radio-nodes 103 have sufficient capacity to handle traffic in primary coverage areas 107 including secondary coverage area 109. According to still other embodiments of the present invention, network management node 111 and processor 205 may share aspects of active/sleep mode decisions for secondary radio-node 101.

According to some embodiments of the present invention, primary radio-node 103a may provide communications according to a first RAT, primary radio-node 103b may provide communications according to a second RAT, and secondary radio-node 101 may provide communications according to the first and second RATs and according to a third RAT (not supported by either of primary radio-nodes 103a or 103b). In the sleep mode, secondary radio-node 101 may monitor up-link communications according to the first and second RATs. User terminal 105a may initiate communications with primary radio-node 103a according to the first RAT outside coverage area 109, user terminal 105b may initiate communications with primary radio-node 103b according to the second RAT outside coverage area 109, and secondary radio-node 101 may be in the sleep mode monitoring for user terminal transmission within coverage area 109 according to either of the first or second RATs. When one or both of user terminals 105a and/or 105b move within coverage area 109, receiver 203 and/or processor 205 of secondary radio-node 101 may detect transmissions of user terminals 105a/105b and change to the active mode. Accordingly, communications for user terminals 105a/105b may be handed off to secondary radio-node 101 to provide increased network capacity without changing a RAT used by either of user terminals 105a or 105b. Once user terminals 105a/105b terminate communications with secondary radio-node 101 and/or move outside secondary coverage area 109, secondary radio-node 101 may return from the active mode to the sleep mode.

According to some embodiments of the present invention, user terminal 105a and secondary radio-node 101 may support communications according to first, second, and third RATs, but primary radio-node 103a may only support communications according to the first RAT. In the sleep mode, secondary radio-node 101 may monitor up-link communications according to the first RAT. User terminal 105a may initially establish a communication with primary radio-node 103a according to the first RAT that is supported by both user terminal 105a and primary radio-node 103a outside secondary coverage area 109. When user terminal 105a moves within secondary coverage area 109, receiver 203 and/or processor 205 of secondary radio-node 101 may detect communications for user terminal 105a according to the first RAT and change to active mode. Accordingly, the communication for user terminal 105a may be handed off to secondary radio-node 101 to provide communications for user terminal 105a according to the second or third RAT to provide improved service for user terminal 105a and/or to increase network capacity. Once user terminal 105a terminates the communication with secondary radio-node 101 and/or moves outside secondary coverage area 109, secondary radio-node may return from the active mode to the sleep mode.

According to some embodiments of the present invention, user terminal 105a and secondary radio-node 101 may support communication according to first and second (different) RATs, and primary radio-node 103a may support communications according to the first RAT (and not the second RAT). In the sleep mode, secondary radio-node 101 may monitor up-link communications according to the first and second RATs. With secondary radio-node 101 in the sleep mode and with user terminal 105a in secondary coverage area 109, user terminal 105a may transmit a request for communications to primary radio-node 103a, and receiver 203 and/or processor 205 of secondary radio node 101 may detect the request and change from the sleep mode to the active mode. Accordingly, the requested communication may be established between user terminal 105a and now active secondary radio-node 101 (without first establishing communication between user terminal 105a and primary radio-node 103a) according to the second RAT so that the higher level of service (provided by the first RAT relative to the second RAT) is provided without requiring a hand-off. In an alternative, user terminal 105a may establish communications with primary radio-node 103a according to the first RAT, and responsive to detecting uplink transmissions from user terminal 105a to primary radio-node 103a (indicating that user terminal 105a supports the second RAT), secondary radio-node 105a may change from sleep mode to active mode. A hand-off of communications for user terminal 105a may then be made from primary radio-node 103a to secondary radio-node 101, and communications between user terminal 105a and secondary radio-node 101 may be provided according to the second RAT not available from the primary radio-node 103a. In still another alternative, user terminal 105a, secondary radio-node 101, and primary radio-node 103a may all support communications according to the same RAT(s), and the communications may be established with the previously sleeping secondary radio-node 101 to increase network capacity. For example, communications between user terminal 105a and primary radio-node 103a may be provided according to a same RAT that is available from secondary radio-node 101, and upon detecting uplink transmissions from user terminal 105a to primary radio-node 103a, secondary radio-node 101 may change from sleep mode operation to active mode operation. Once secondary radio-node 101 has changed to active mode operation, communications for user terminal 105a may be handed off from primary radio-node 103a to secondary radio-node 101 while maintaining communications according to the same RAT.

In FIG. 1, a single secondary radio-node 101 is shown for each of illustration, but multiple secondary radio-nodes 101 may provide service over multiple secondary coverage areas 109. Moreover, multiple secondary coverage areas may be spaced apart and/or overlapping. For example, a plurality of secondary radio-nodes 101 may define respective overlapping secondary coverage areas 109 along a road that is heavily used some portions of the day (e.g., during rush hour) but that is lightly used some other portions of the day (e.g., at night).

While in the sleep mode, a secondary radio-node 109 may thus monitor frequencies of primary radio-nodes 103 as discussed above as well as frequencies of adjacent secondary radio-node(s) 109.

In addition, receiver 203 of secondary radio-node 101 may continue scanning frequencies of primary radio-nodes 103a/103b during the active mode, and results of this active mode scanning may be provided to network management node 111 to facilitate hand-offs of user terminals between radio-nodes and/or to facilitate radio-node load balancing. In addition or in an alternative, information generated by receiver 203 of secondary radio-node 101 responsive to scan frequencies of primary radio-nodes 103a/103b (during the active and/or sleep modes) may be used by network management node 111 to provide load balancing between primary radio-nodes 103a/103b even when secondary radio-node 101 is maintained in the sleep mode.

FIG. 6 is a flow chart illustrating operations of mobile communications networks and/or secondary radio-nodes 101 thereof according to embodiments of the present invention. As discussed above, secondary radio-node 101 may operate in an active mode to provide active communications with user terminals 105 and in a reduced power sleep mode when active communications are not being provided. At block 601, secondary radio node 101 may be in the sleep mode with transmitter 201 off. Monitoring may be provided through the radio-node receiver 203 of the secondary radio-node 101 at block 603 to detect user terminal signals transmitted to the primary radio-node 103, and monitoring may include monitoring over frequencies used by the primary radio-node 103a/103b. If no signals are detected and/or if detected signals do not exceed a threshold (e.g., less than a threshold strength, quantity, duration, etc.) at block 605, the secondary radio-node 101 is maintained in the sleep mode with the radio-node transmitter 201 of the secondary radio-node 101 off at block 601 and monitoring continues. If signals are detected and/or if detected signals exceed the threshold (e.g., greater than a threshold strength, quantity, duration, etc.) at block 605, operation of the secondary radio-node 101 may be changed from the sleep mode to an active mode at block 607 responsive to detecting the user terminal signals during monitoring in the sleep mode. In the active mode, radio-node transmitter 201 of the secondary radio-node 101 may be turned on.

After changing operation of the secondary radio-node 101 to the active mode at block 607, active mode communications may be provided at block 609. For example, secondary radio-node 101 may provide active mode communications with user terminal 105a/105b so that communications with user terminal 105a/105b are received at radio-node receiver 203 of secondary radio-node 101 and transmitted from radio-node transmitter 201 of secondary radio-node 101. Active mode communications may be maintained at block 611, for example, as long as communications services with user terminal 105 or other user terminals are needed in secondary coverage area 109. Once the decision to return to the sleep mode is made at block 611 (e.g., when active mode communications between secondary radio-node 101 at user terminal 105a/105b are no longer needed), secondary radio-node 101 may return to the sleep mode at blocks 615 and 601 and resume monitoring at block 603. The decision whether to maintain secondary radio-node 101 in the sleep mode at block 611 may be based on a termination of all communications between secondary radio-node 101 and user terminals 105a/105b in secondary coverage area 109. For example, secondary radio-node may be returned to the sleep mode once a threshold period of time passes without providing any communications between secondary radio-node 101 and any user terminals.

Operations of FIG. 6 may be performed by elements of secondary radio-node 101 (including processor 205, receiver 203, and/or transmitter 201), by elements of network management node 111, and/or by elements of primary radio-nodes 103a/103b and/or other secondary radio-nodes. Decisions at blocks 605 and/or 611 may be made at processor 205, at network management node 111, and/or at processors of other primary and/or secondary radio-nodes. Moreover, decisions at blocks 605 and/or 611 may be made based on detection of user terminal signals at other primary and/or secondary radio-nodes as well as detection of user terminal signals at the secondary radio-node.

By providing a reduced power sleep mode where secondary radio-node 101 monitors (e.g., scans) for user terminal uplink transmissions from its secondary coverage area 109 without transmitting, secondary radio-node 101 may detect the presence of the user terminals, and secondary radio-node 101 may be reactivated to the active mode responsive to detecting the presence of the user terminals. In densely populated areas, for example, secondary radio-node 101 may provide additional capacity when needed while reducing power consumption in the sleep mode when not needed. Secondary radio-nodes according to embodiments of the present invention may thus allow a communications network to dynamically adapt to spatially and temporally changing demand for communications traffic by maintaining continuous coverage with primary radio-nodes that are always on and by using to secondary radio-nodes that provide additional capacity in the active mode when needed and that return to the sleep mode when not needed.

Many variations and modifications can be made to the embodiments without substantially departing from the principles of the present invention. All such variations and modifications are intended to be included herein within the scope of the present invention, as set forth in the following claims.

That which is claimed is:

1. A method of operating a secondary radio-node in a mobile communications network, wherein the secondary radio-node includes a radio-node transmitter and a radio-node receiver, and wherein the mobile communications network includes a primary radio-node, the method comprising:
   monitoring through the radio-node receiver of the secondary radio-node to detect user terminal signals transmitted to the primary radio-node while maintaining the secondary radio-node in a sleep mode; and
   responsive to detecting user terminal signals during monitoring in the sleep-mode, changing operation of the secondary radio-node from the sleep mode to an active mode,
   wherein the secondary radio-node provides a Radio Access Technology (RAT) that is unavailable from the primary radio-node.

2. The method according to claim 1 wherein the primary radio-node and the secondary radio-node define respective overlapping primary coverage area and secondary coverage area, and wherein detecting user terminal signals comprises detecting user terminal signals transmitted from a user terminal operating in the secondary coverage area to the primary radio-node, the method further comprising:
   responsive to changing operation of the secondary radio-node to the active mode, providing communications with the user terminal from the secondary radio-node so that the communications with the user terminal are received at the radio-node receiver of the secondary radio-node and transmitted from the radio-node transmitter of the secondary radio-node.

3. The method according to claim 2 further comprising:
   after terminating communication between the user terminal and the secondary radio-node, changing operation of the secondary radio-node from the active mode to the sleep mode.

4. The method according to claim 2 wherein monitoring to detect user terminal signals comprises monitoring over frequencies used by the primary radio-node.

5. The method according to claim 4 wherein the primary radio-node and the secondary radio-node operate over a same frequency band, wherein monitoring comprises monitoring the frequency band to detect user terminal signals, and wherein the communications with the user terminal are received at the radio-node receiver of the secondary radio-node over the frequency band.

6. The method according to claim 4 wherein the primary radio-node and the secondary radio-node operate using respective different first and second frequency bands, wherein monitoring comprises monitoring the first frequency band to detect user terminal signals, and wherein the communications with the user terminal are received at the radio-node receiver of the secondary radio-node over the second frequency band.

7. The method according to claim 1 wherein monitoring to detect user terminal signals comprises monitoring received signal strength over frequencies used by the primary radio-node without decoding and/or without converting to baseband, and wherein the secondary radio-node is changed from the sleep mode to the active mode responsive to the received signal strength exceeding a received signal strength threshold.

8. The method according to claim 1 wherein monitoring to detect user terminal signals comprises monitoring a number of user terminals transmitting over frequencies used by the primary radio-node, and wherein the secondary radio-node is changed from the sleep mode to the active mode responsive to the number of user terminals exceeding a threshold number of user terminals.

9. The method according to claim 1 wherein monitoring comprises monitoring to detect user terminal signals from a user terminal compatible with the Radio Access Technology provided by the secondary radio-node, and wherein changing operation of the secondary radio-node comprises providing communications with the user terminal from the secondary radio-node according to the Radio Access Technology so that the communications with the user terminal are received at the radio-node receiver of the secondary radio-node and transmitted from the radio-node transmitter of the secondary radio-node.

10. A secondary radio-node in a mobile communications network including a primary radio-node, the secondary radio-node comprising:
   a radio-node transmitter;
   a radio-node receiver; and
   a processor coupled to the radio-node transmitter and to the radio-node receiver of the secondary radio-node, wherein the processor is configured to monitor through the radio-node receiver to detect user terminal signals transmitted to the primary radio-node while maintaining the secondary radio-node in a sleep-mode, and to change operation of the secondary radio-node from the sleep mode to an active mode responsive to detecting user terminal signals during monitoring in the sleep-mode, wherein the processor, the radio-node receiver, and the radio-node transmitter of the secondary radio-node are configured to provide communications according to a Radio Access Technology (RAT) that is unavailable from the primary radio-node.

11. The secondary radio-node according to claim 10 wherein the primary radio-node and the secondary radio node define respective overlapping primary coverage area and secondary coverage area, wherein the processor is configured to monitor to detect through the radio-node receiver user terminal signals transmitted from a user terminal operating in the secondary coverage area to the primary radio-node, and wherein the processor is configured to provide communications with the user terminal through the radio-node transmitter and the radio-node receiver responsive to changing operation of the secondary radio-node to the active mode.

12. The secondary radio-node according to claim 11 wherein the radio-node receiver of the secondary radio-node includes an active mode receiver configured to receive communications during active mode operation and a sleep mode receiver configured to detect user terminal signals during sleep mode operation.

13. The secondary radio-node according to claim 11 wherein the processor is configured to change operation of the secondary radio-node from the active mode to the sleep mode after terminating communication between the user terminal and the secondary radio-node.

14. The secondary radio-node according to claim 11 wherein the processor is configured to monitor to detect user terminal signals by monitoring over frequencies used by the primary radio-node.

15. The secondary radio-node according to claim 14 wherein the primary radio-node and the secondary radio-node operate over a same frequency band, wherein the processor and the radio-node receiver of the secondary radio-node are configured to monitor the frequency band to detect user terminal signals, and wherein the processor and the radio-node receiver of the secondary radio-node are configured to receive communications from the user terminal over the frequency band.

16. The secondary radio-node according to claim 14 wherein the primary radio-node and the secondary radio-node operate using respective different first and second frequency bands, wherein the processor and radio-node receiver of the secondary radio-node are configured to monitor the first frequency band to detect user terminal signals, and wherein the processor and the radio-node receiver of the secondary radio-node are configured to receive communications from the user terminal over the second frequency band.

17. The secondary radio-node according to claim 16 wherein the radio-node receiver of the secondary radio-node includes an active mode receiver configured to receive communications over the second frequency band during active mode operation and a sleep mode receiver configured to monitor the first frequency band during sleep mode operation.

18. The secondary radio-node according to claim 10 wherein the processor is configured to monitor received signal strength over frequencies used by the primary radio-node without decoding and/or without converting to baseband, and wherein the processor is configured to change the secondary radio-node from the sleep mode to the active mode responsive to the received signal strength exceeding a received signal strength threshold.

19. The secondary radio-node according to claim 10 wherein the processor is configured to monitor a number of user terminals transmitting over frequencies used by the primary radio-node, and wherein the processor is configured to change the secondary radio-node from the sleep mode to the active mode responsive to the number of user terminals exceeding a threshold number of user terminals.

20. The secondary radio-node according to claim 10, wherein the processor and the radio-node receiver of the secondary radio-node are configured to detect user terminal signals from a user terminal compatible with the Radio Access Technology provided by the secondary radio-node, and wherein the processor is configured to provide communications with the user terminal from the secondary radio-node according to the Radio Access Technology so that the communications with the user terminal are received at the radio-node receiver of the secondary radio-node and transmitted from the radio-node transmitter of the secondary radio-node.

* * * * *

UNITED STATES PATENT AND TRADEMARK OFFICE
CERTIFICATE OF CORRECTION

PATENT NO.      : 8,331,995 B2
APPLICATION NO. : 12/831838
DATED           : December 11, 2012
INVENTOR(S)     : Hevizi et al.

Page 1 of 1

It is certified that error appears in the above-identified patent and that said Letters Patent is hereby corrected as shown below:

In the Specifications:

In Column 11, Line 8, delete "401W" and insert -- 401b' --, therefor.

In Column 12, Line 21, delete "conserver power." and insert -- conserve power. --, therefor.

In the Claims:

In Column 20, Line 29, in Claim 20, delete "claim 10," and insert -- claim 10 --, therefor.

Signed and Sealed this
Sixteenth Day of April, 2013

Teresa Stanek Rea
*Acting Director of the United States Patent and Trademark Office*